(12) United States Patent
Zhao et al.

(10) Patent No.: US 9,058,550 B2
(45) Date of Patent: Jun. 16, 2015

(54) MOBILE DEVICES WITH RFID CAPABILITIES AND CORRESPONDING MEMORY WRITE METHODS

(71) Applicant: MOTOROLA MOBILITY LLC, Libertyville, IL (US)

(72) Inventors: Hong Zhao, Naperville, IL (US); Naveen Aerrabotu, Gurnee, IL (US); Douglas A. Lautner, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 123 days.

(21) Appl. No.: 13/759,455

(22) Filed: Feb. 5, 2013

(65) Prior Publication Data

US 2014/0191041 A1 Jul. 10, 2014

Related U.S. Application Data

(60) Provisional application No. 61/748,836, filed on Jan. 4, 2013.

(51) Int. Cl.
*G06K 19/06* (2006.01)
*G06K 19/07* (2006.01)
(Continued)

(52) U.S. Cl.
CPC ........ *G06K 19/0723* (2013.01); *G06F 11/3476* (2013.01); *H04M 1/7253* (2013.01);
(Continued)

(58) Field of Classification Search
USPC .......................... 235/492, 487, 494, 380, 375
IPC ............. G06K 19/07749,19/06037, 7/14; G07F 7/1008; B42D 15/10; G06Q 30/02,20/341
See application file for complete search history.

(56) References Cited

U.S. PATENT DOCUMENTS 6,177,860 B1 1/2001 Cromer et al.
6,826,762 B2 11/2004 Shell et al.
(Continued)

FOREIGN PATENT DOCUMENTS

EP 2199946 A1 6/2010
WO 2010080073 A2 7/2010
WO 2011150009 A1 12/2011

OTHER PUBLICATIONS

MPINJ MONZA® X-2K and X-8K Dura Chips Deliver Exciting New Benefits to Manufacturers of Consumer Electronics, http://www.impinj.com/News_and_Events/Press_Releases/2012/Impinj_Monza_X-2K_and_X-8K_Dura_Chips_Deliver_Exciting_New_Benefits_to_Manufacturers_of_Consumer_Electronics.aspx, May 23, 2012, all pages.
(Continued)

*Primary Examiner* — Karl D Frech
(74) *Attorney, Agent, or Firm* — Leydig, Voit & Mayer, LTD.

(57) ABSTRACT

An electronic device (100) includes a control circuit (108) that is operable with a memory or storage device (120). The electronic device includes an RFID tag (113) having a second memory (118). The RFID tag can be read from, or written to, by a RFID communication device (114) when the electronic device is OFF. Device personalization can be achieved when the control circuit accesses the second memory to retrieve the device configuration data during a boot sequence and configures the electronic device in accordance with the device configuration data retrieved from the second memory during the boot sequence. Device information can be made available when the electronic device is OFF by writing the device information to the second memory.

20 Claims, 15 Drawing Sheets

(51) Int. Cl.
  *G06F 11/34* (2006.01)
  *H04M 1/725* (2006.01)
  *G06F 9/44* (2006.01)
  *G06F 11/30* (2006.01)
  *G06F 11/07* (2006.01)

(52) U.S. Cl.
  CPC .......... *G06F9/4401* (2013.01); *G06F 11/3065* (2013.01); *G06F 11/0742* (2013.01); *H04M 2250/04* (2013.01)

(56) References Cited

U.S. PATENT DOCUMENTS

| | | | |
|---|---|---|---|
| 6,873,259 B2 | 3/2005 | Teraura | |
| 6,942,158 B2* | 9/2005 | Waters | 235/492 |
| 6,961,000 B2* | 11/2005 | Chung | 340/572.1 |
| 8,284,055 B2 | 10/2012 | Butler et al. | |
| 2006/0026316 A1 | 2/2006 | Milenkovic et al. | |
| 2008/0160984 A1 | 7/2008 | Benes et al. | |
| 2009/0109041 A1 | 4/2009 | Greeff | |
| 2010/0150581 A1* | 6/2010 | Nakamura et al. | 399/18 |
| 2010/0302006 A1 | 12/2010 | Subramanian | |
| 2012/0044060 A1 | 2/2012 | Matsubara et al. | |

OTHER PUBLICATIONS

RFID Business Applications, http://www.rfidjournal.com/article/articleprint/1334/-1/1, Oct. 28, 2012, all pages.
Fast and Secure Service With RFID-Tagged Phones, http://www.smartrac-group.com/en/success-stories-fast-and-secure-service-with-rfid-tagged-phones.php, Oct. 28, 2012, all pages.
Bernd Schoner, Embedded RFID: Why we got excited about passive RFID in the first place!, http://rfid.thingmagic.com/rfid-blog/?month=10&year=2012, Oct. 24, 2012, all pages.
Patent Cooperation Treaty, International Search Report and Written Opinion of the International Searching Authority for International Application No. PCT/US2013/077831, May 12, 2014, 13 pages.

* cited by examiner

MOBILE DEVICES WITH RFID CAPABILITIES AND CORRESPONDING MEMORY WRITE METHODS

BACKGROUND

1. Technical Field

This invention relates generally to electronic devices, and more particularly to circuits of electronic devices.

2. Background Art

Electronic devices, such as mobile phones, smart phones, tablet computers, other computer devices such as laptops, desktops, or mobile computers, personal digital assistants, routers, or other devices, typically require user personalization. This personalization can be configured at the enterprise level or by the end user. The data associated with the personalization may be extensive. Sometimes unique personality keys or other identifiers are required for personalization. For example, a login identifier for a corporate laptop, an application profile for an enterprise tablet computer or smart phone, a region code in a wireless router, and the like, may be included in the personalization information.

Generally speaking, configuring an electronic device to a specific personality is frequently done as part of a custom rework process. This custom rework process involves powering up the electronic device and entering the appropriate configuration information. Accordingly, the configuration process can involve unpacking the electronic device, powering the device up, performing the configuration operation, performing a personalization and quality control process, powering down the device, and then repackaging the device. Where the electronic device is portable, such as with a smart phone or tablet computer, the configuration process may also require at least partially charging a rechargeable battery. As can be imagined, the current configuration process can be slow and tedious. It can further affect manufacturing throughput, increase end user downtime, and introduce configuration errors. In addition, shipping completely personalized devices may create a security risk.

It would be advantageous to have an improved system and techniques for configuring and personalizing computer devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
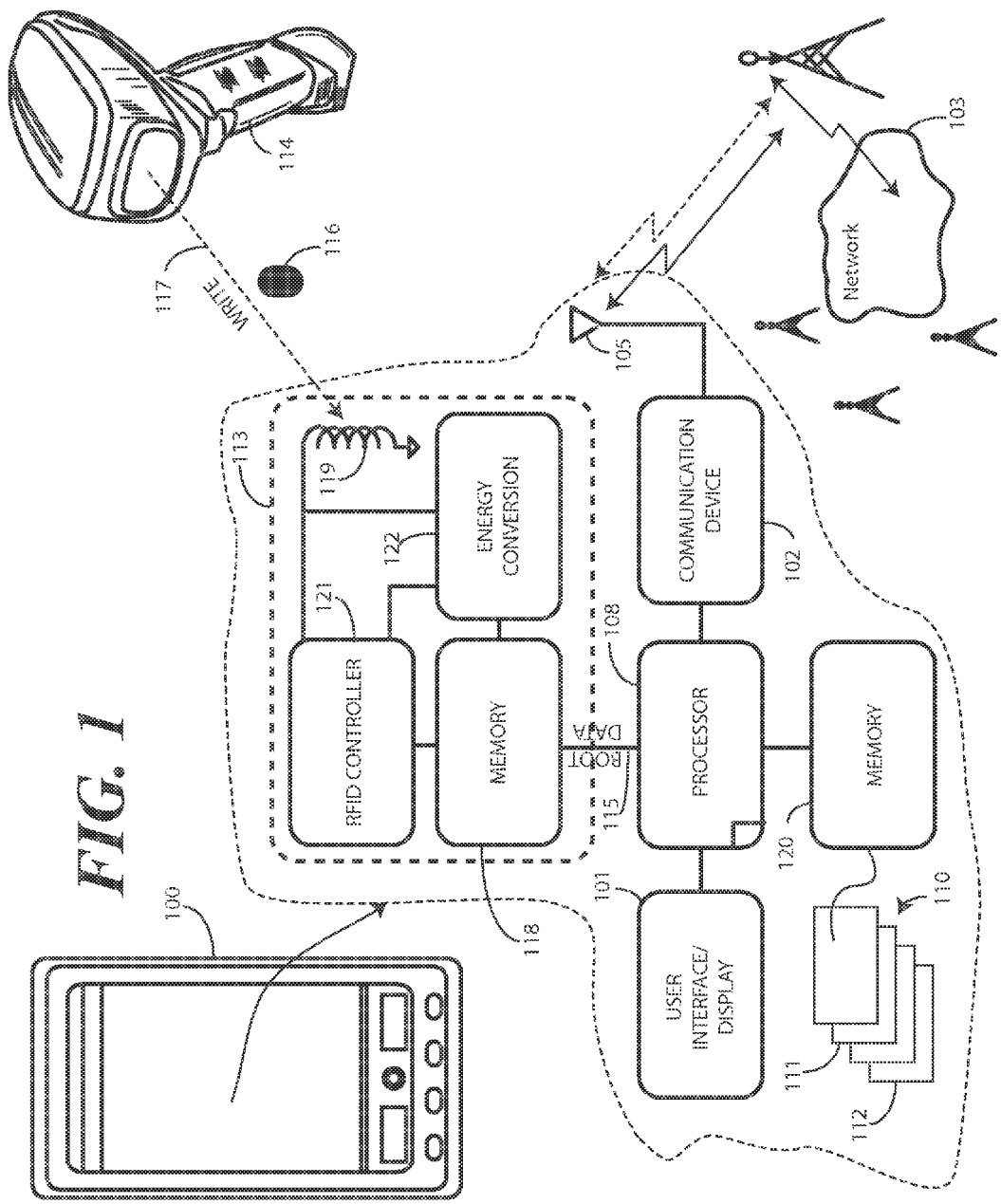
FIG. 1 illustrates one embodiment of an electronic device, and corresponding system, configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to employing an electronic device having an integrated Radio Frequency Identification (RFID) tag having an associated memory, to which personalization information can be written to and from when the electronic device is powered OFF, and which the electronic device can execute a boot sequence by reading the RFID memory device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the method steps, executable code instructions, and software commands associated with configuring, booting, reading, and writing to and from an integrated RFID tag as described herein. The non-processor circuits may include, but are not limited to, a radio receiver, a radio transmitter, signal drivers, clock circuits, power source circuits, and user input devices. As such, these functions may be interpreted as steps of a method to perform the configuration and operation steps employing the integrated RFID tag and associated memory as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In one embodiment, an electronic device includes a control circuit and an integrated RFID tag. The control circuit is operable with a first memory. A boot sequence can be stored in the first memory such that the control circuit may operably boot the electronic device in response to either transforming from a powered OFF state to a powered ON state, or alternatively in response to user input or reset requests.

The RFID tag includes a second memory that can be used to store device configuration data received from an RFID communication interface. The configuration data can be written to the second memory when the electronic device is powered OFF due to the fact that the RFID tag can include an energy conversion circuit operable to power the RFID tag and the second memory from power received from a received RFID communication signal.

In one embodiment, the boot sequence stored in the first memory is operable to instruct the control circuit to access the second memory to retrieve the device configuration data during the boot sequence. The boot sequence stored in the first memory can further instruct the control circuit to configure the electronic device in accordance with the device configuration data retrieved from the second memory during the boot sequence. In effect, rather than first completely booting the electronic device and then reading configuration data from the second memory, in one embodiment the control circuit boots from the second memory in that the second memory is read and used to configure the electronic device during the boot sequence itself, rather than subsequently thereto. Advantageously, this reduces the overall boot time when compared to prior art designs.

In one embodiment, a communication interface of the RFID tag can receive configuration data while a control circuit of the electronic device is OFF. Once a user powers the electronic ON by powering the control circuit ON, the control circuit can execute its boot sequence from the instruction set stored within the first memory. During the boot sequence, the control circuit can retrieve the device configuration data from the second memory and can configure the electronic device in accordance with the device configuration data during the boot sequence so that the device is fully configured and personalized when the boot sequence finishes.

In another embodiment, the control circuit can be configured to write information to the second memory so that it can later be read when the electronic device and control circuit are powered OFF. This written information can include device information, user information, or personalization information. For example, in one embodiment, the control circuit can function by executing operating instructions for the electronic device retrieved from the first memory. The second memory of the RFID tag, embedded in the electronic device, can be operable to store data that will be readable from an RFID communication interface when the electronic device is OFF. A communication bus can couple the control circuit and the second memory. The control circuit can then write device information to the second memory in response to a trigger. Examples of triggers include user input or a device operating malfunction. Advantageously, a technician can read, for example, malfunction diagnostics from the second memory without powering ON the electronic device. Thus, if the device operating malfunction occurs when a user spills wine on their phone, the control circuit, detecting this condition with a moisture sensor, can write, "moisture detected" to the second memory. Then, even if the wine renders the control circuit non-operational, a technician will be able to determine that the electronic device is not working due to the fact that wine was spilled on the device.

Turning now to FIG. 1, illustrated therein is an explanatory electronic device 100 configured in accordance with one or more embodiments of the invention. The illustrative electronic device 100 of FIG. 1 is shown as a smart phone for illustration. However, it will be obvious to those of ordinary skill in the art having the benefit of this disclosure that other portable electronic devices may be substituted for the explanatory smart phone of FIG. 1. For example, the electronic device 100 may be configured as a palm-top computer, a tablet computer, a gaming device, wearable computer, a media player, laptop computer, portable computer, or other device.

The explanatory electronic device 100 is shown illustratively in FIG. 1 in an operating environment, along with a schematic block diagram, incorporating explanatory embodiments of the present invention. As shown, the illustrative electronic device 100 may include standard components such a user interface 101. The user interface 101 can include the display, which may be touch-sensitive. Alternatively, the user interface 101 can include keypads, keyboards, user input devices, voice inputs, facial feature inputs, gesture inputs, and so forth.

This illustrative electronic device 100 of FIG. 1 also includes a communication interface 102. The communication interface 102 can be configured for communication with one or more networks, such as the wide area network 103 shown in FIG. 1. The communication interface 102 can also be configured to communicate with a local area network or short-range network as well. The communication interface 102 can include wireless communication circuitry, one of a receiver, a transmitter, or transceiver, and an antenna 105.

In one or more embodiments, the communication interface 102 can be configured for data communication with at least one wide area network 103. For illustration, the wide area network 103 of FIG. 1 is shown as a cellular network being operated by a service provider. Examples of cellular networks include GSM, CDMA, W-CDMA, CDMA-2000, iDEN, TDMA, and other networks. It should be understood that the communication interface 102 could be configured to communicate with multiple wide area networks as well, with one being shown in FIG. 1 for simplicity. The communication interface 102 can also be configured to communicate with a local area network (not shown), such as a Wi-Fi network being supported by a base station. Alternatively, the local area network can be via a Bluetooth™ or other local area communication protocols.

In this illustrative embodiment, the electronic device 100 includes a control circuit 108, which in FIG. 1 is illustrated as one or more processors. The control circuit 108 is responsible for performing the various functions of the device. The control circuit 108 can be a microprocessor, a group of processing components, one or more Application Specific Integrated Circuits (ASICs), programmable logic, or other type of processing device. The control circuit 108 can be operable with the user interface 101 and the communication interface 102, as well as various peripheral ports (not shown) that can be coupled to peripheral hardware devices via interface connections.

The control circuit 108 can be configured to process and execute executable software code to perform the various functions of the electronic device 100. A storage device 120, such as a memory module, stores the executable software code used by the control circuit 108 for device operation. The storage device 120 may also store identification, configuration, and personalization information suitable for identifying the electronic device 100 or its user.

The executable software code used by the control circuit 108 can be configured as one or more modules 110 that are operable with the control circuit. Such modules 110 can comprise instructions, such as control algorithms, that are stored in a computer-readable medium such as the memory described above. Such computer instructions can instruct processors or control circuit 108 to perform methods described below in FIGS. 7-10. In other embodiments, additional modules could be provided as needed.

For example, one module 111 may be a boot sequence that is operable to load segments of operable code to "start up" the electronic device 100. The electronic device's Basic Input/Output System (BIOS) follows the boot sequence set forth in the module 111 to boot the electronic device after performing any initial diagnostic testing set forth in the boot sequence. Illustrating by example, the boot sequence may instruct the control circuit 108 to search for an Operating System (OS) module 112 in storage device 120. As will be described below, in one or more embodiments, the boot sequence may instruct the control circuit 108 to search for portions of the OS in other locations as well. In one embodiment, module 111 can include system level operational information for the electronic device 100 and/or control circuit 108 to operate. An example of system level information can include, but is not limited to, system commands and non-personalized configuration files.

In one embodiment, the electronic device 100 further includes a RFID tag 113. The RFID tag 113 can be integrated into the electronic device 100. In one embodiment, the RFID tag can be written to and/or read from via an external RFID communication device 114, as well as be written to and/or read from via a communication bus 115 to the control circuit 108. Accordingly, the RFID communication device 114 can read or write information 116 to or from the RFID tag 113 via RF signals 117. Alternatively, the control circuit 108 can read or write information to or from the RFID tag 113 via the communication bus 115 linking the RFID tag 113 and the control circuit 108. Accordingly, the RFID tag 113 can be considered a "dual-access" RFID tag since two devices, one internal and one external, can read or write to a memory 118 of the RFID tag.

In one embodiment, the RFID tag 113 employs UHF RFID technology, which is a wireless technology that uses the 900 MHz ISM band to transmit data between the RFID communication device 114 and the RFID tag 113. The RFID tag 113 can be completely passive, i.e., no battery needed. Further, the read distance can be up to a few meters depending on the RF output power of the RFID communication device 114 and the design of the antenna 119 of the RFID tag 113. In one embodiment, the communication protocol follows the EPCglobal's Gen-2 standard.

The use of RFID technology offers several advantages over related configuration technologies such as near field communication, BlueTooth™ and Wi-Fi. These advantages include an extended communication range up to thirty feet, the use of a passive RFID tag 113 in the electronic device 100, and bi-directional data communication along the communication bus 115.

In one embodiment, the RFID tag 113 is disposed on a substrate of the electronic device and includes an RFID coil or antenna 119 to receive data from the RFID communication device 114. In one embodiment, the antenna 119 of the RFID tag 113 can be any number of one, two, or more separate antennas of any suitable antenna type, including dipole, loop, slot, or patch. The antenna 119 is operable with a RFID controller 121 that encodes and decodes data received from the antenna 119 for storage into, or extraction from, a memory 118 of the RFID tag 113. Note that in the illustrative embodiment of FIG. 1, the memory 118 of the RFID tag 113 is separate and distinct from the memory of the electronic device 100 itself, which is shown in FIG. 1 as storage device 120. Accordingly, the storage device 120 forms a "first memory" of the electronic device 100, while the memory 118 of the RFID tag 113 forms a "second memory" that is separate and distinct from the storage device 120. In one embodiment, the memory 118 of the RFID tag 113 comprises an EEPROM divided into four memory banks. The Gen-2 protocol allows one or more of the memory banks, e.g., a "user" memory bank, to be locked with password, or permalocked. In another embodiment, the memory banks can be equipped with public key encryption and other security features.

In this illustrative embodiment, the RFID tag 113 also includes an energy conversion device 122 that extracts power necessary to operate the RFID tag 113 from remotely received RFID signals 117. Accordingly, a remote RFID communication device 114 can read to and/or write from the RFID tag while the control circuit 108 and other components of the electronic device 100 are powered OFF. In one embodiment, the energy conversion device 122 includes a rectifier for converting a portion of the RF energy received in the form of RFID signals 117 into DC power that can be used to power both the RFID controller 121 and the memory 118 of the RFID tag 113. The rectified power can be stored in a capacitor or other storage device of the energy conversion device 122. Once sufficient power has been accumulated from the RF signals 117, it can be amplified and provided to modulator or demodulator circuits (not shown) of the RFID tag 113 for conversion into digital signals which can be detected and acted upon and/or stored into the memory 118 of the RFID tag 113 by the logic of the RFID controller 121. A level shifter can provide steps in converting the RFID signals 117 to digital signals by isolating a clock from the data and providing each to the RFID controller 121. It will be obvious to those of ordinary skill in the art having the benefit of this disclosure that the RFID tag 113 can also include any number of modulators, demodulators, charge pumps, and so forth. The RFID tag 113 can include other elements as well, such as an impedance matching network and/or other circuitry necessary to facilitate RFID communication. While the illustrative RFID tag 113 of FIG. 1 is shown as a passive tag having the energy conversion device 122, it should be noted that the RFID tag 113 may alternatively be an active tag that is powered by a battery.

Advantageously, the electronic device 100 can utilize the RFID tag 113 to rapidly personalize the device. Additionally, the use of the RFID tag 113 can eliminate the need to unpack and power up the electronic device 100 as a prerequisite to configuration. For example, in one embodiment, the control circuit 108 can be configured to execute a boot sequence stored as a module 111 within the first memory, which is shown as storage device 120 in FIG. 1. While the electronic device 100 is powered OFF, the RFID communication device 114 can transmit RFID signals 117 to the antenna 119 of the RFID tag 113. The energy conversion device 122 can power the RFID controller 121 and the memory 118 of the RFID tag 113 with parasitic energy from the RFID signals 117. In one embodiment, the RFID signals 117 contain device configuration data, which is shown illustratively as information 116 in FIG. 1. The RFID controller 121 can then write this device configuration data to the memory 118 of the RFID tag 113. As noted, each of these steps can occur while the electronic device 100, and correspondingly the control circuit 108, are powered OFF.

Once the electronic device 100 is powered on, the control circuit 108 can be configured to retrieve the boot sequence, shown as module 111 in FIG. 1. The boot sequence then instructs the control circuit 108 to access the second memory, i.e., the memory 118 of the RFID tag 113, to retrieve the device configuration data during the boot sequence. In this embodiment, the device configuration data constitutes a portion of the boot sequence itself. Further, in one or more embodiments, the device configuration data includes not only configuration data and personalization data, but instructions as well. Accordingly, in such an embodiment module 111 may include first instructions that direct the control circuit 108 to the second memory. Once in communication with the second memory, the control circuit 108 may retrieve additional instructions from the device configuration data that direct the control circuit 108 back to module 111. This is in addition to retrieving any configuration parameters that are stored in the device configuration data.

Module 111 can further instruct the control circuit 108 to configure the electronic device 100 in accordance with the device configuration data retrieved from the memory 118 of the RFID tag 113. In one embodiment, this configuration can occur during the boot sequence, not after as with prior art designs, to expedite the boot and personalization process.

In one embodiment, module 111 can provide other instructions for the control circuit 108 as well. For example, in one embodiment module 111 can further instruct the control circuit 108 to cause the communication interface 102 of the electronic device 100 to initiate communication with a network, such as network 103. Module 111 can additionally instruct the control circuit 108 to connect the communication interface 102 to the network 103 using a network credential that was included with, and retrieved from, the device configuration data stored in the memory 118 of the RFID tag 113. Module 111 may also instruct the control circuit 108 to download data from the network 103 as well.

In one or more embodiments, the device configuration data comprises device personalization data. Examples of device personalization data include one or more of a ringtone, wallpaper, or video created by a user. In other embodiments, the device personalization data can include one or more of a user name, a user wallpaper preference, a user ringtone preference, a user home screen arrangement preference, a region preference, or a language preference. The device personalization data can include one or more of network login credentials or application login credentials, such as user names, passwords, Personal Identification Numbers (PINs), and so forth. One example of an application login credential is that of an electronic mail login. One example of a network login credential would be that of a user name and password required to join a Virtual Private Network (VPN) or other password accessible network. Of course, combinations of the above can be included in the device personalization data as well. These examples are meant to be illustrative, as others will be obvious to those of ordinary skill in the art having the benefit of this disclosure.

In other embodiments, the device configuration data can take the place of labels or barcodes. For example, in one embodiment, the device configuration data can comprise manufacturing label information or barcode label information. As is known in the art, from a product design perspective, barcode lines and product labeling can be subjectively unattractive and require high contrast device exteriors. By using the RFID tag 113 as a machine-readable barcode or product label, a manufacturer is able to keep this information in the device but remove it from the outer surfaces of the device, thereby cleaning up the "out-of-box experience" offered by the product.

Accordingly, the control circuit 108 can be configured to execute the steps of a method for configuring the electronic device 100 by using the RFID tag 113. For example, the control circuit 108 can determine device personalization data for the electronic device 100 during the boot sequence by retrieving the device personalization data from the memory 118 of the RFID tag 113 through the communication bus 115. In one embodiment, this retrieval occurs upon the electronic device 100 powering ON. Further, the device personalization data can be stored in the memory 118 of the RFID tag 113 while the electronic device 100 or control circuit 108 is powered OFF, as previously described.

Figure 11:
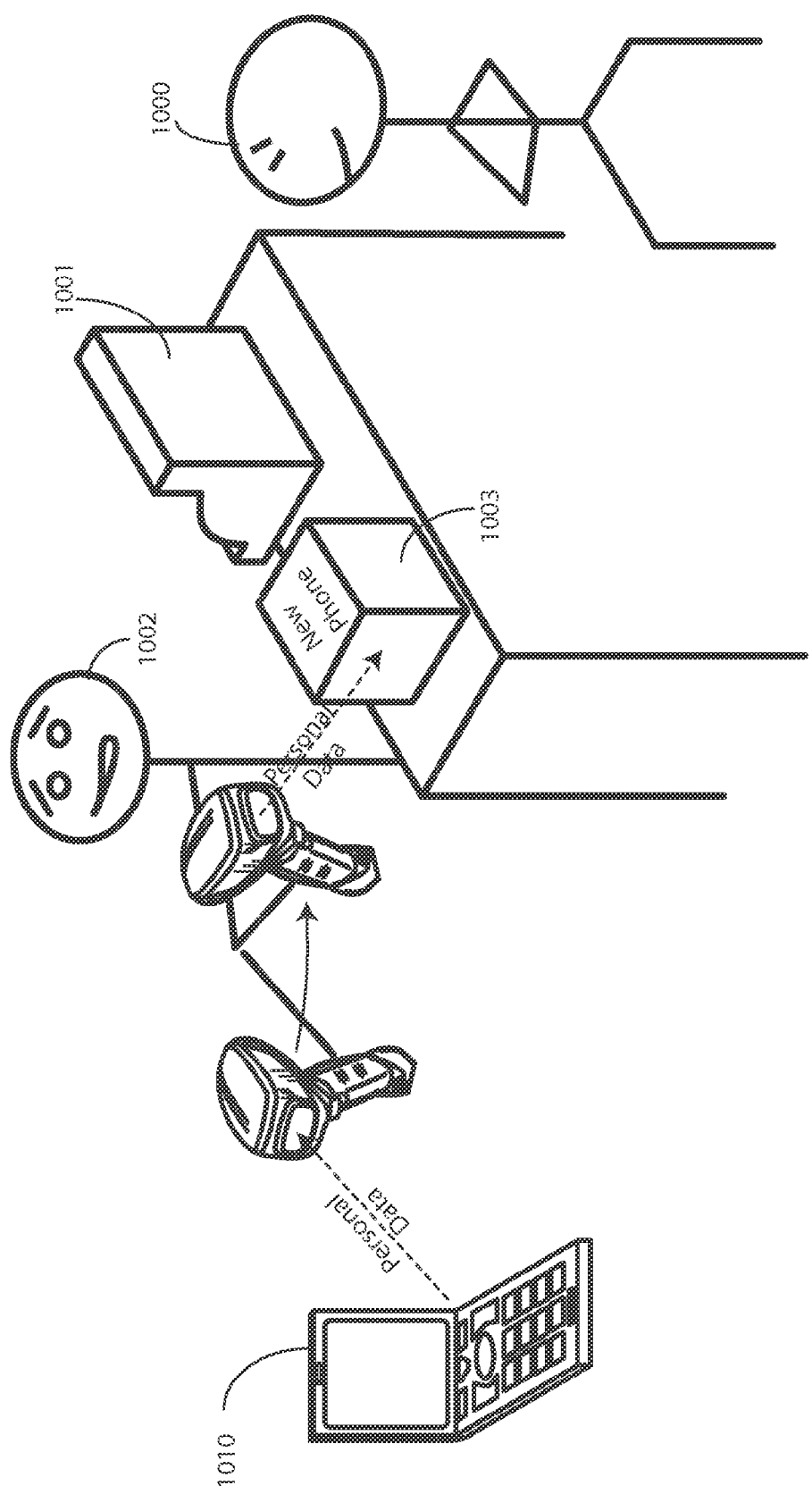
FIG. 11 illustrates another explanatory use case for one embodiment of an electronic device, and corresponding system, configured in accordance with one or more embodiments of the invention.

As will be shown in more detail with reference to FIGS. 11 and 12 below, in one embodiment where the electronic device 100 is disposed within packaging, device personalization data can be delivered to the memory 118 of the RFID tag 113 by the RFID communication device 114 while the electronic device 100 is disposed within the packaging. Advantageously, there is no need to either open the packaging or power ON the electronic device to personalize and/or customize the electronic device 100. Further, since the control circuit 108 will retrieve the device personalization data during the boot sequence, when powered ON the electronic device will immediately be personalized for the user. A salesperson at a point of sale terminal can pre-configure the electronic device 100 to be customized for the user without even taking the electronic device 100 out of the box, as the device personalization data is transmitted straight through the packaging without the need of any flaps or openings. Further, as the RFID tag 113 does not require any power from the electronic device 100 to be operable, the electronic device need not be powered ON to be personalized. Where the user is purchasing multiple devices, embodiments of the invention allow all devices to be personalized almost simultaneously with a single RFID signal 117.

In one embodiment, for security purposes, the control circuit 108 can be instructed to require a user to authenticate themself prior to completing the boot sequence. For example, if a salesman customizes a device in the packaging and the device is subsequently lost or stolen, a user may not want their personal data to be initially available to a burglar. Accordingly, in one embodiment, module 111 instructs the control circuit 108 to request that the user enter authentication information, with the authentication information compared to data stored in the memory 118 of the RFID tag 113. In one embodiment, the authentication information is received with the device configuration data from the remote RFID communication device 114.

In another embodiment, module 111 can instruct the control circuit 108 to prompt the user for additional device configuration information. Where so, the control circuit 108 can configure the electronic device 100 in accordance with a combination of the device configuration information retrieved from the memory 118 of the RFID tag 113 and the additional device configuration information received from the user interface 101. In one embodiment, the additional device configuration information is user-configurable information for operation of the electronic device 100. Examples of additional device configuration information include security settings such as password settings, file locks, and so forth.

In one embodiment, the additional device configuration information can also be received from the external RFID communication device 114. Where this is the case, the additional device configuration information received from the user interface 101 can be compared to the additional device configuration information stored within the memory 118 of the RFID tag 113. Where there is a match, the control circuit 108 can complete the boot sequence. Where there is a mismatch, the control circuit 108 can be configured to detect that the user is not authorized to use the electronic device 100, and may power OFF.

Figure 2:
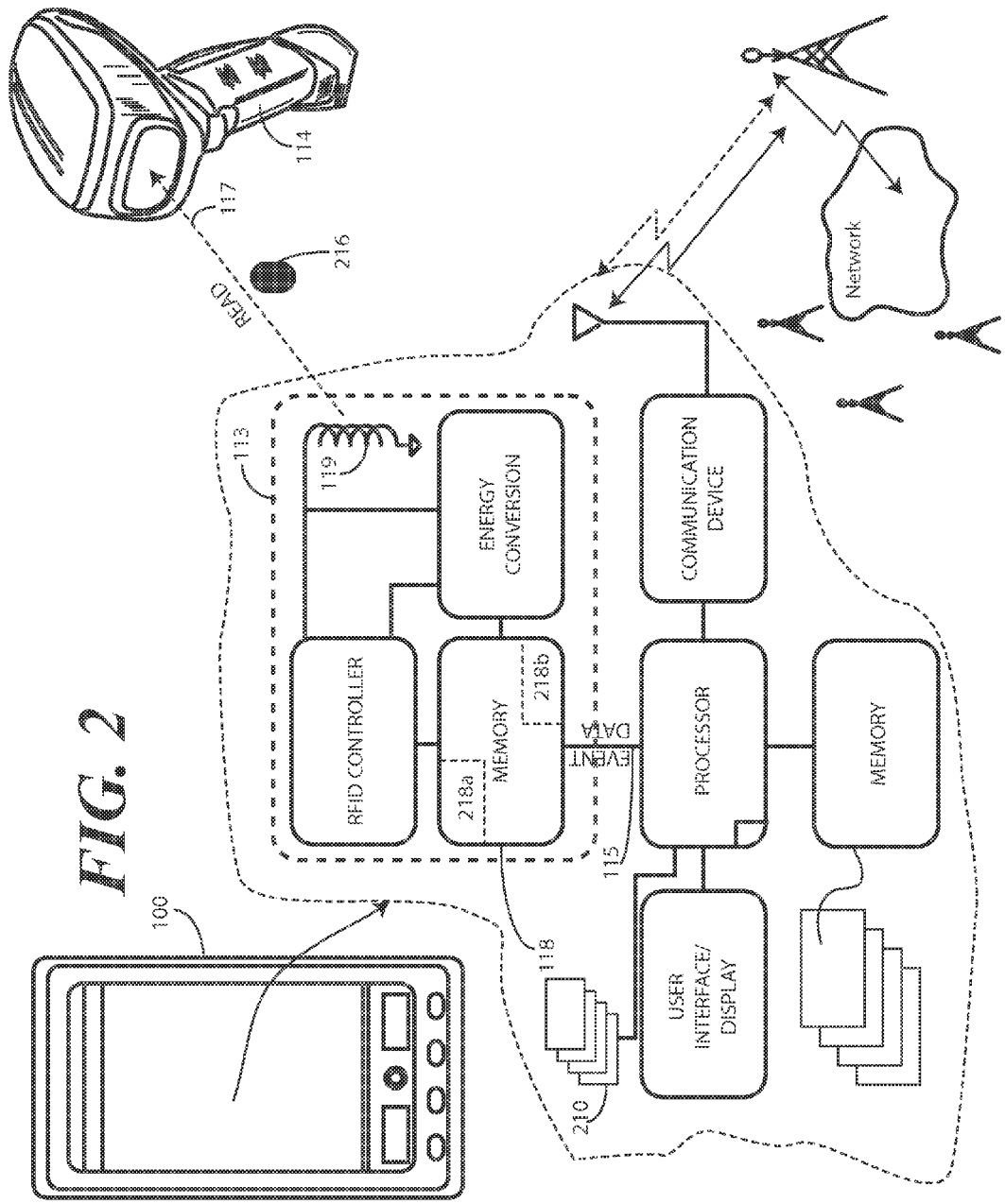
FIG. 2 illustrates another embodiment of an electronic device, and corresponding system, configured in accordance with one or more embodiments of the invention.

Delivering device configuration data to the RFID tag 113 while the electronic device 100 is powered OFF, with that device configuration data being used by the control circuit 108 during the boot sequence when the electronic device 100 is powered ON, is only one way that the RFID tag can be used. Turning now to FIG. 2, communication in the opposite direction will be described.

In the embodiment of FIG. 2, the control circuit 108 is initially powered ON and executes operating instructions for the electronic device retrieved from storage device 120. As with FIG. 1, the RFID tag 113 is embedded in the electronic device and comprises the second memory, i.e., the memory 118 of the RFID tag 113, to store data. The data is readable from the RFID communication interface, shown illustratively as the antenna 119 in FIG. 2, when the electronic device is OFF as previously described. In one embodiment, the control circuit 108 is configured to write device information across the communication bus coupling the control circuit 108 and the memory 118 of the RFID tag 113 in response to a trigger. Once done, this device information can be read by the remote RFID communication device 114 regardless of whether the electronic device 100 is powered ON or powered OFF.

The triggers from which the control circuit 108 writes device information can vary. In one embodiment, the trigger comprises a device malfunction. For instance, in one embodiment, the electronic device 100 comprises one or more device sensors 210 that are operable with the control circuit 108. Examples of the device sensors 210 include a temperature sensor, a moisture sensor, an accelerometer, a gyroscope, a pressure sensor, or combinations thereof. When the device sensors 210 detect a condition exceeding a predefined sensor threshold, the appropriate device sensor may deliver an interrupt signal to the control circuit 108 that causes the control circuit to write information corresponding to the device sensor to the memory 118 of the RFID tag 113. The interrupt can comprise a device sensor output responsive to a device condition. Examples of device conditions can include excessive moisture, excessive acceleration, excessive temperature, excessively low temperatures, excessive pressure, or combinations thereof. Others will be obvious to those of ordinary skill in the art having the benefit of this disclosure.

Illustrating by example, if a user drops the electronic device 100, an accelerometer may detect the drop, the impact, or both. If either the drop acceleration or the impact deceleration exceed a predetermined threshold of the accelerometer, the accelerometer may deliver an interrupt to the control circuit 108 causing it to write an error message to the memory 118 of the RFID tag 113. The error message might say, "This device has been catastrophically dropped and may not function properly." Thus, presuming that the drop was forceful enough to render the control circuit 108 inoperable, a technician or manufacturer's representative can read the error message with a remote RFID communication device 114 even though the control circuit 108 is no longer operational to diagnose the cause of the lack of operation.

In other embodiments, the trigger and/or interrupt can comprise user input. For example, if the user believes that the battery of the electronic device 100 is about to die, the user may want selected information to be written to the memory 118 of the RFID tag 113 so that it can be read with an RFID communication device 114 after the battery dies. A user in a remote location may want to write, for example, medical or identification information to the memory 118 of the RFID tag 113 so that medical personnel can read the same with a RFID communication device 114 in the event that the electronic device's battery dies or the electronic device 100 becomes otherwise inoperable.

In yet another embodiment, the interrupt may be received externally from the RFID communication device 114. For example, device information may need to be retrieved from the control circuit 108 while the control circuit 108 is powered ON. Accordingly, a person may request the device information 216 from the RFID tag 113. However, in some embodiments, the control circuit 108 may be instructed to use only the storage device 120 while in operation. In such embodiments, the RFID signals 117 may include an interrupt that requests the control circuit to write device information to the memory 118 of the RFID tag 113 such that it can be read by the RFID communication device 114. The interrupt to the control circuit 108 can thus comprise an interrupt signal received from the communication bus 115 in response to a query received from the antenna 119 RFID communication interface of the RFID tag 113.

The device information written to the memory 118 of the RFID tag 113, regardless of which interrupt it is responsive to, can vary. Examples of sensor outputs have previously been described. In one or more embodiments, the device information includes device personalization information. Examples of device personalization information include one or more of a user name, a user wallpaper preference, a user ringtone preference, a user home screen arrangement preference, a device name, a device model number, a device manufacturing date, a software version number, a hardware version number, a device serial number, a device purchase date, a device purchase place, a warranty expiration date, a hardware failure code, a hardware time of failure, a software crash code, or combinations thereof. In one or more embodiments, the device information comprises emergency information associated with a user of the device. In other embodiments, the device information comprises barcode information such that the RFID tag 113 can take the place of a conventional barcode. In other embodiments, the device information comprises service information. Other examples of device information will be obvious to those of ordinary skill in the art having the benefit of this disclosure.

In one or more embodiments, to provide additional security, the memory 118 of the RFID tag 113 can be partitioned into different sections 218a, 218b. The different sections 218a, 218b can include different authorization levels of access. For example, a first section 218a may be accessible to anyone, while a second section 218b may be accessible only to authorized personnel. Said differently, the memory 118 of the RFID tag 113 can be partitioned into sections 218a, 218b requiring different credentials for access thereto. Where this is the case, the control circuit 108 can be configured to select one of the sections 218a, 218b prior to writing the device information to the memory 118 of the RFID tag 113. Further, the RFID signals 117 received from the remote RFID communication device 114 may include access credentials that allow access to, for example, the second section 218b. To provide additional security, the control circuit can be configured to assign an access or authorization level to the device information prior to writing the device information to the memory 118 of the RFID tag 113.

Figure 3:
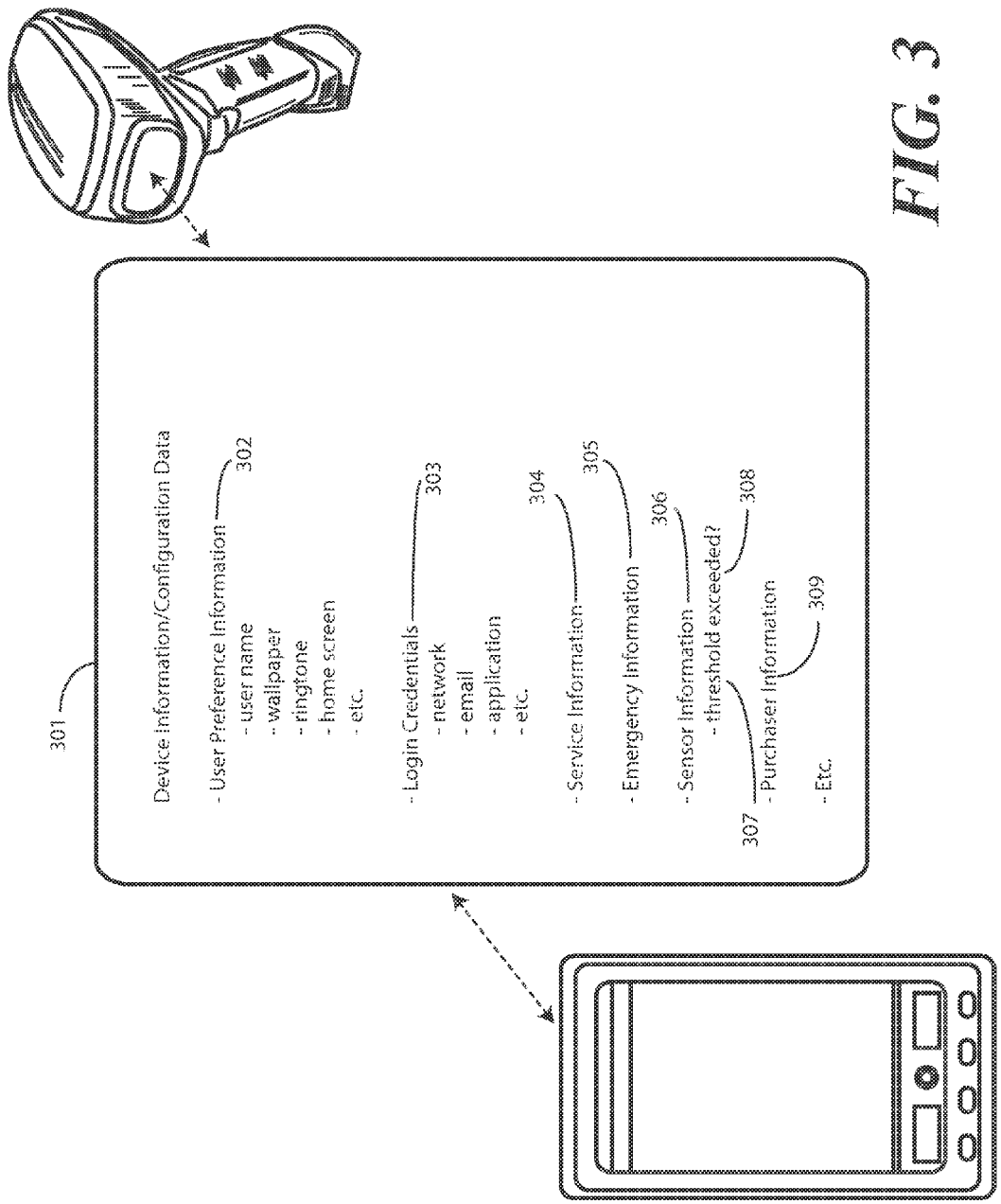
FIG. 3 illustrates one explanatory use case for one embodiment of an electronic device, and corresponding system, configured in accordance with one or more embodiments of the invention.

Turning now to FIG. 3, illustrated therein is one example of device information 301 or device configuration data that can be delivered to, or alternatively read from, the memory (118) of the RFID tag (113) of an electronic device 100 configured in accordance with one or more embodiments of the invention. As noted above, the device information 301 can be delivered to, or alternatively read from, the memory (118) when the electronic device 100 is powered OFF in one or more embodiments. Alternatively, the device information 301 can be delivered to, or alternatively read from, the memory (118) when the electronic device 100 is powered ON in other embodiments.

In one embodiment, the device information 301 comprises user preference information 302. Examples of user preference information 302 include a user name, a user wallpaper preference for presentation on the display, a user ringtone preference where the electronic device 100 is a communication device, a user home screen preference, and so forth.

In another embodiment, the device information 301 can comprise network or application login credentials 303. These credentials can include an email application login, a network login, an application login, and so forth.

In another embodiment, the device information 301 can comprise service information 304. For example, if a power management sensor detects that a rechargeable battery of the electronic device has been inappropriately cycled or has been cycled beyond its service life, the device information 301 may include a service message stating that the rechargeable battery needs to be changed.

In another embodiment, the device information 301 may include emergency information 305 pertaining to the user. Imagine a scenario where a hiker is lost in the woods and notices that the battery of his electronic device 100 is about to deplete its stored energy. If the hiker thinks he may be emaciated when discovered, the hiker may request the control circuit (108) of the electronic device 100 to write his medical information or next of kin information to the memory (118) of the RFID tag (113) so that it is readable by medical or coroner personnel when the hiker is found with an inoperable electronic device 100.

In yet another embodiment, the device information 301 can comprise sensor information 306. For example, if a moisture sensor detects excessive moisture by way of a threshold 307 of the moisture sensor being exceeded 308, the device information 301 may include a message that drying or other service information should be performed on the electronic device 100 when the electronic device 100 is sent to the repair shop.

In yet another embodiment, the device information 301 can comprise information relating the device itself, e.g., serial numbers, manufacture dates, operating system information, hardware information, etc. In yet another embodiment, the device information 301 can comprise purchaser information 309, such as the name, address, or telephone number of the person who purchased the electronic device 100. The examples shown in FIG. 3 are illustrative only, and are not meant to be limiting. Other types of device information 301 will be obvious to those of ordinary skill in the art having the benefit of this disclosure.

Figure 4:
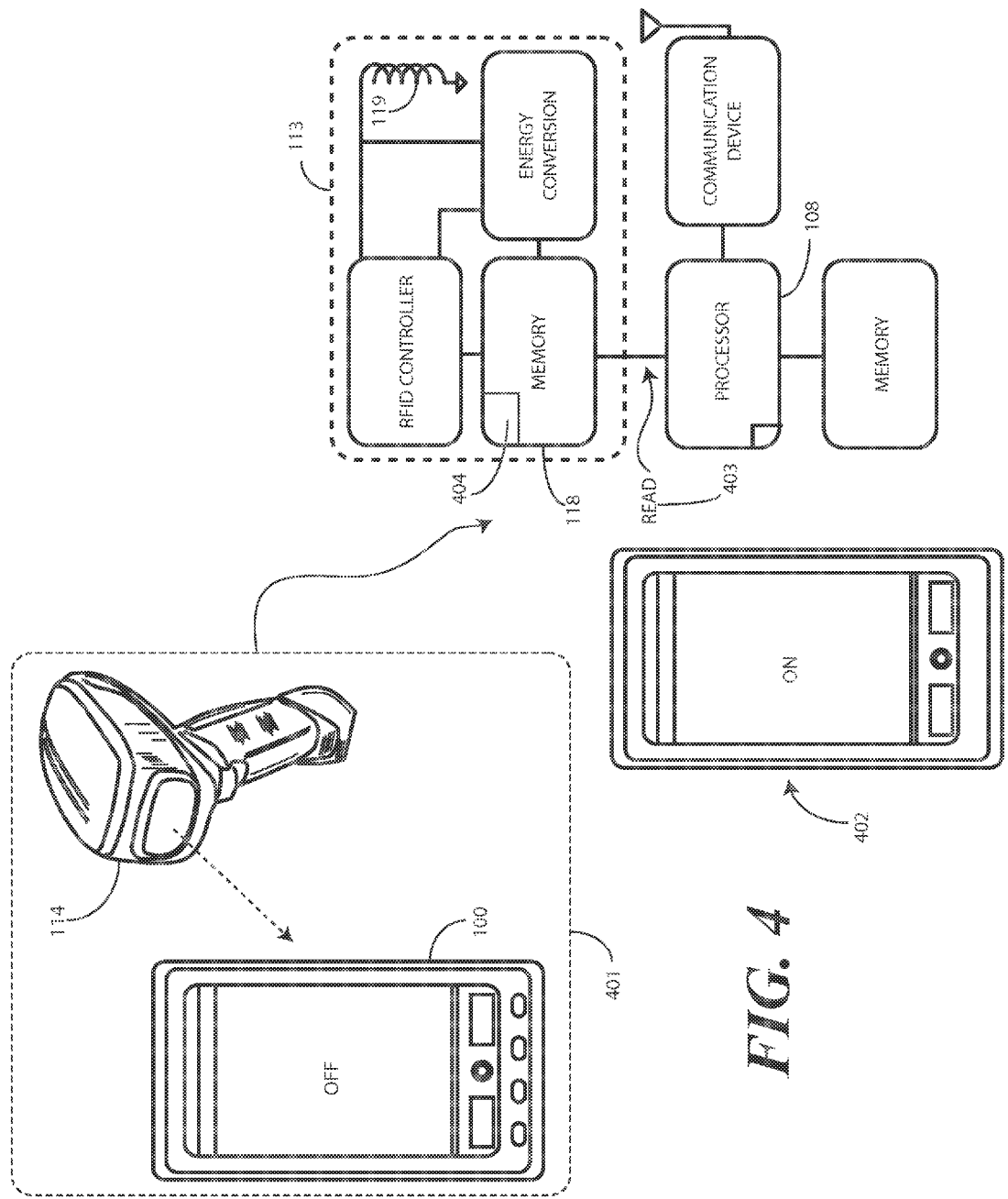
FIG. 4 illustrates one embodiment of personalization information suitable for configuration in accordance with one or more embodiments of the invention.

Turning now to FIG. 4, illustrated therein is one example of a method of configuring an electronic device 100 configured in accordance with one or more embodiments of the invention. As shown at state 401, the electronic device is OFF. A server or computer operable with the RFID communication device 114 has determined device personalization information for the electronic device 100. This can be accomplished in any of a variety of ways.

In one embodiment, the user may simply deliver the device personalization information to the server or computer. For example, when ordering a new device, the user may employ a web portal configured as an on-line store to enter the device personalization information into the web portal. The device personalization information may then be delivered to the server or computer. In such an embodiment, the determining can include retrieving the device configuration data from the server, which is operable with the web portal that functions in this case as a user accessible configuration portal.

In another embodiment, the RFID communication device 114 may read the device personalization information from another electronic device. In such an embodiment, the determining can include reading, with the RFID communication device 114, the device configuration data from another electronic device prior to the delivering. In another embodiment, the user may deliver the device personalization information to a kiosk that is selling new electronic devices. In such an embodiment, the determining can include retrieving the device configuration data from the kiosk, which is operable to communicate the device configuration data to the RFID communication device 114. In another embodiment, the user may deliver the device personalization information to a point of sale terminal Other methods will be obvious to those of ordinary skill in the art having the benefit of this disclosure.

Regardless of how the information is determined, in one embodiment the RFID communication device 114 delivers the device personalization information to a RFID communication interface, which may be configured as an antenna 119, while the electronic device 100 is powered OFF, as is the case in state 401. As noted above, the electronic device 100 may be disposed within packaging when the device personalization information is delivered. Accordingly, state 401 may comprise the electronic device 100 being disposed within packaging. Moreover, the delivering step shown at state 401 can comprise omitting opening the packaging prior to delivering.

When the electronic device 100 is powered ON, as shown at state 402, in one embodiment the control circuit 108 of the electronic device 100 accesses 403 the memory 118 of the RFID tag 113 to retrieve the device personalization information 404 during its boot sequence, and to configure the electronic device 100 in accordance with the device personalization information retrieved from the memory 118 of the RFID tag 113 during the boot sequence. The steps of this action have been described previously with reference to FIG. 1.

Figure 5:
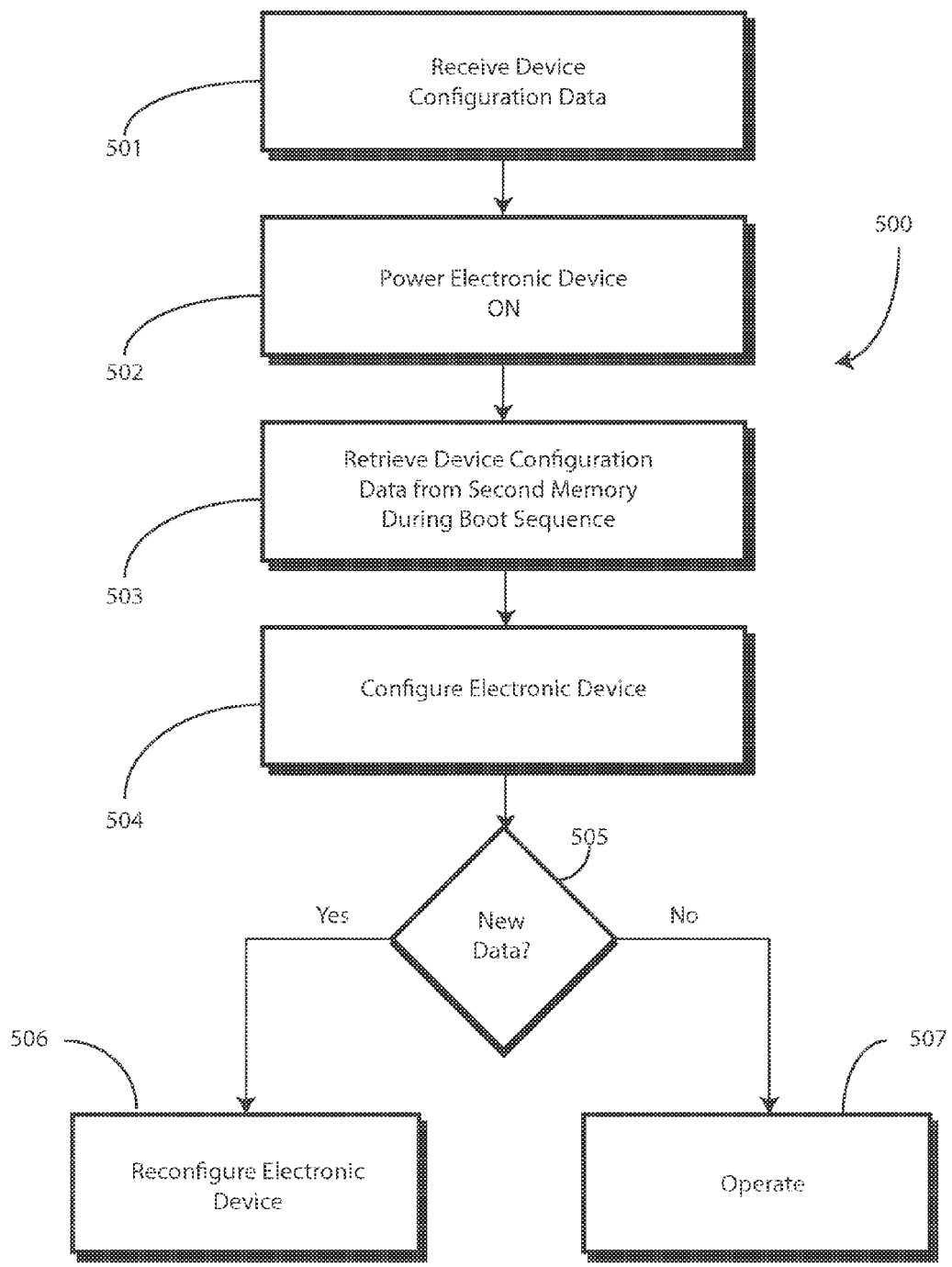
FIG. 5 illustrates one method for an electronic device configured in accordance with one or more embodiments of the invention.

Turning now to FIG. 5, illustrated therein is a method 500 of configuring an electronic device in accordance with one or more embodiments of the invention. The method 500 can be executed using the hardware components, in one embodiment, that are described above with reference to FIGS. 1-4.

At step 501, device configuration data is received at an RFID communication interface of an RFID tag embedded in the electronic device. In one embodiment, the device configuration data received at step 501 is received when the electronic device is OFF. The device configuration data, in one embodiment, is received from a RFID communication device via RFID communication signals. The RFID communication device can be operable with a server computer, which received the device configuration information from one of a variety of sources. For example, in one embodiment the server computer receives the device configuration data from a point of sale terminal when a user purchases the electronic device. In another embodiment, the server computer receives the device configuration data from a kiosk. In another embodiment, the server computer receives the device configuration data from another electronic device by way of the RFID communication device, which reads the device configuration data from the other electronic device. In yet another embodiment, the device configuration data is received from a user portal, such as a website, across a network. For instance, a user may log on to an on-line storefront, order an electronic device, and upload or enter device configuration data. The on-line storefront can then transfer the device configuration data to the server computer and on to the RFID communication device.

In one embodiment, the device configuration data received at step 501 comprises one or more of a ringtone, wallpaper for presentation on a display, or a video. The video may be created at the point of sale terminal or kiosk in one or more embodiments. For example, a user purchasing the electronic device at a kiosk may want to create a video where the user is dancing around singing, "I just got a new phone!" That video, created at the kiosk, can be delivered in the electronic device configuration data via the RFID tag so that the electronic device, when powered ON, will present the video on the display as the first activity. Videos may also be created at the point of sale terminal in a similar manner.

In another embodiment, the device configuration data comprises one of a user name, a user wallpaper preference, a user ringtone preference, a user home screen arrangement preference, a region preference, a language preference, or combinations thereof. In another embodiment, the device configuration data comprises one or more of network login credentials or application login credentials. In another embodiment, the device configuration data comprises an electronic mail login credential. In yet another embodiment, the device configuration data comprises information retrieved from another electronic device. In another embodiment, the device configuration data comprises one or more of a user configuration preference, user context information, user location information, a user uniform resource locator, or a user login credential.

At step 502, the electronic device is powered ON. At step 503, a control circuit or processor of the electronic device executes a boot sequence received from a first memory. The boot sequence is operative to boot the control circuit, thereby booting the electronic device.

At step 503, which occurs during the boot sequence in one embodiment, the control circuit retrieves the device configuration data from the second memory. In one embodiment, the second memory is that of the RFID tag, and includes the device configuration data received when the electronic device was powered OFF. At step 504, the control circuit configures the electronic device in accordance with the device configuration data. In one embodiment, step 504 occurs during the boot sequence and results in a configuration of the electronic device that is completed prior to the termination of the boot sequence.

While the electronic device is powered ON, new device configuration data can be written to the RFID tag. The control circuit determines this at decision 505 by detecting whether an interrupt actuated when updated device configuration data from the RFID communication interface of the RFID tag is received. Where it is, the control circuit can reconfigure the electronic device at step 506. Where it is not, the control circuit can operate the electronic device at step 507, with the electronic device being configured in accordance with the device configuration data received at step 501.

Figure 6:
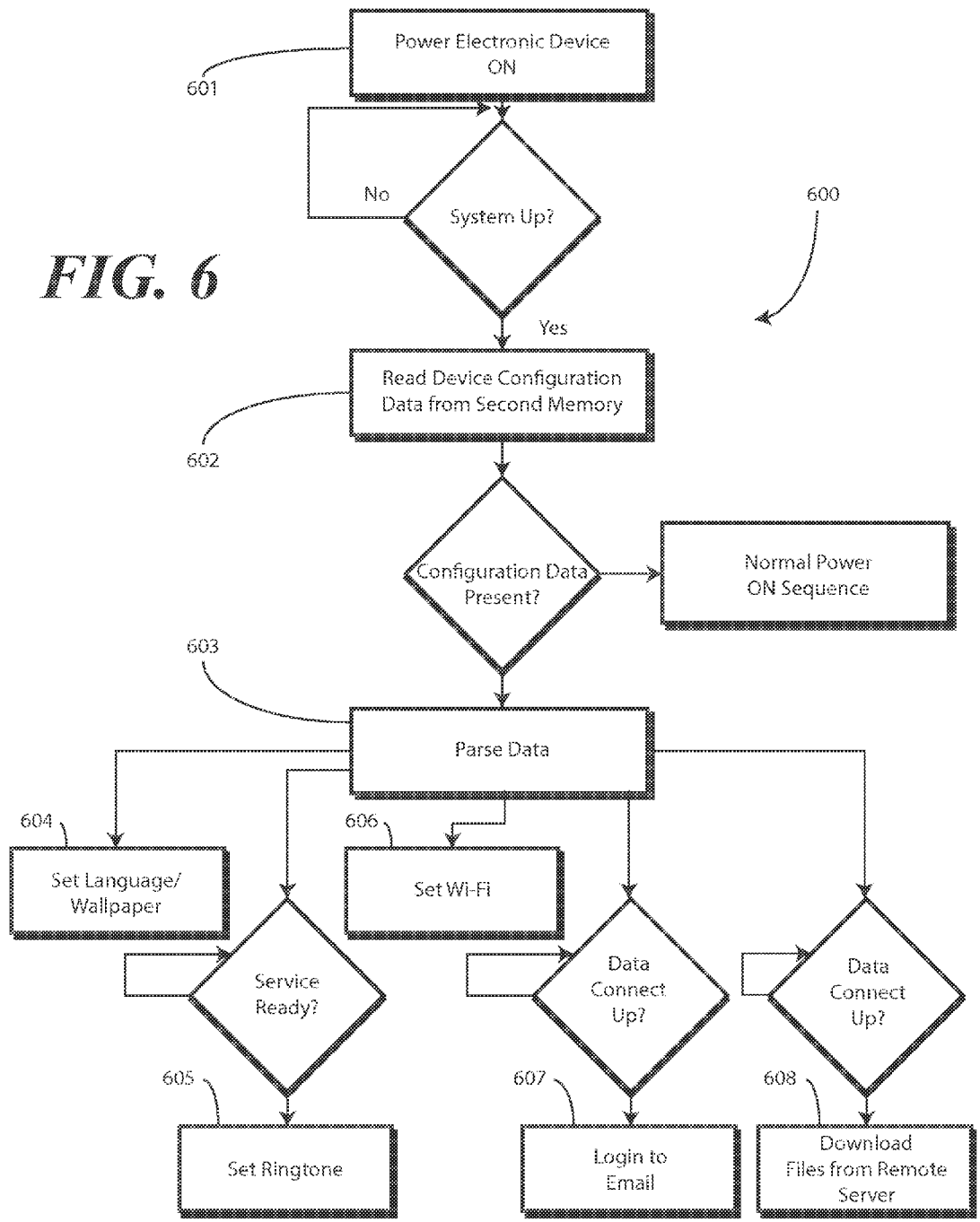
FIG. 6 illustrates another method for an electronic device configured in accordance with one or more embodiments of the invention.

Turning now to FIG. 6, illustrated therein is another method 600 for configuring an electronic device in accordance with one or more embodiments of the invention. The method 600 of FIG. 6 assumes that the device configuration data, which was received at step (501) in FIG. 5, is already stored in the memory of the RFID tag, which constitutes the second memory of the electronic device.

At step 601, the electronic device is powered ON. Once the system is ready to begin the boot sequence, the control circuit attempts to retrieve the device configuration data from the second memory, i.e., the memory of the RFID tag, at step 602. In one embodiment, the second memory is that of the RFID tag, and includes the device configuration data received when the electronic device was powered OFF. Where device configuration data is present in the second memory, the control circuit then parses the data at step 603. The remaining steps shown in FIG. 6 then provide examples of configuration options that may be set in accordance with the device configuration data. For example, in one embodiment, the control circuit can set the language preference and/or wallpaper preference at step 604. In one embodiment, the control circuit can set the ringtone preference at step 605. In another embodiment, the control circuit can set the local area network communication preferences, which may include the identification of a particular network and/or the user login credentials used to connect to the network at step 606. In another embodiment, the control circuit can establish data connectivity and connect to a preferred user email account at step 607. Similarly, the control circuit can download files from a remote server in accordance with the device configuration data at step 608.

Figure 7:
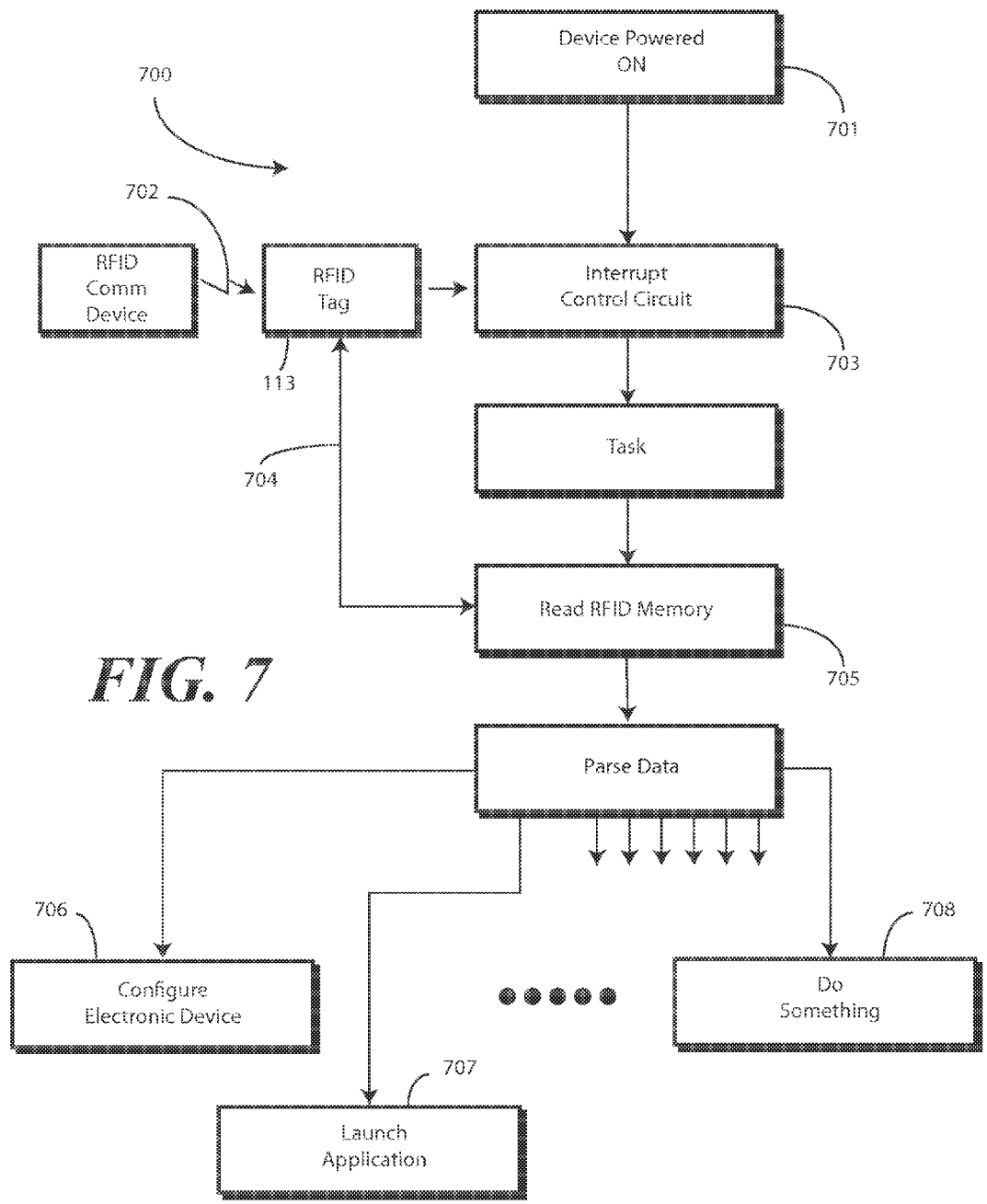
FIG. 7 illustrates another method for an electronic device configured in accordance with one or more embodiments of the invention.

Turning now to FIG. 7, illustrated therein is a method 700 for reconfiguring the electronic device when new device configuration data is delivered to the RFID tag. As shown at step 701, the electronic device is initially powered ON. A RFID communication device then writes 702 new device configuration data to the RFID tag 113. This writing action then generates an interrupt for the control circuit at step 703. The interrupt then causes the control circuit to read the second memory, disposed in the RFID tag, at step 704. The retrieved device configuration data is then parsed at step 705. From there, as with FIG. 6 above, a number of steps can occur. In one embodiment, the control circuit can reconfigure the electronic device at step 706. Alternatively, the control circuit can launch an application at step 707. Other actions, shown generally as a "do something" step 708 can be performed as well. Examples of "do something steps include" connecting the electronic device to a network device, such as Wi-Fi access point in accordance with the network access credentials in the device configuration data received from the second memory during the boot sequence, logging in to remote user accounts such as email in accordance with the login credentials in the device configuration data received from the second memory during the boot sequence, and downloading certain contents such as ringtone, wallpaper, or video clip from a remote server in accordance with URLs in the device configuration data received from the second memory during the boot sequence.

Figure 8:
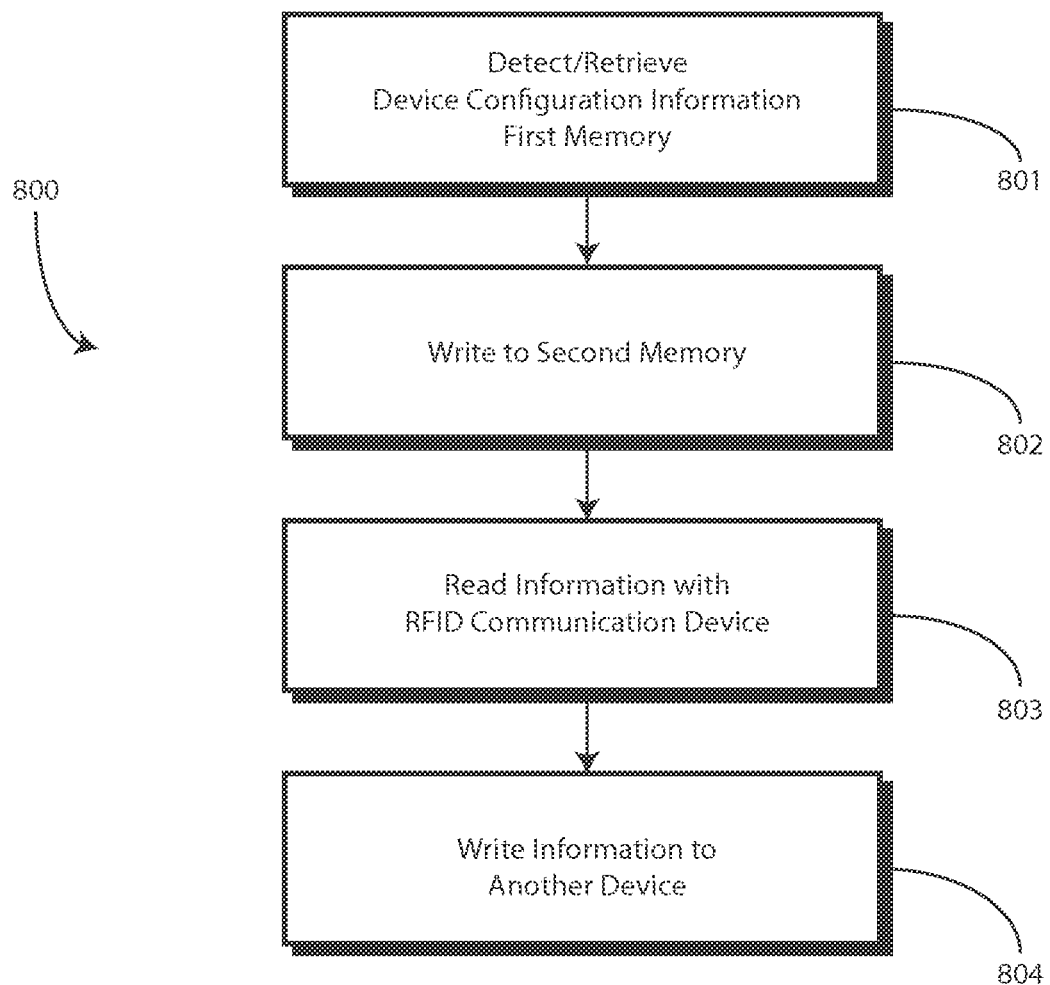
FIG. 8 illustrates another method for an electronic device configured in accordance with one or more embodiments of the invention.

Turning now to FIG. 8, illustrated therein is a method 800 of making device information, which can include or comprise device configuration data, available from an electronic device when the electronic device is OFF. At step 801, the control circuit detects and/or retrieves the device information from a first memory. As noted above, the device information can comprise a predefined device operating condition. Alternatively, the device information can comprise information identified by a user input. One example of such information is medical or emergency information of a user that the user may want to be available if the electronic device is powered OFF or becomes inoperative.

At step 802, the control circuit writes the device information to the second memory, which in one embodiment is the memory operable in the RFID tag embedded within the electronic device and operable with an RFID communication interface. As described above, in one or more embodiments, the RFID memory is readable through the RFID communication interface when the electronic device is powered OFF. This step 802 ensures that the information will be accessible by an RFID communication device when the electronic device stops working.

At optional step 803, the device information can be read with the RFID communication device. Where the device information is to be delivered to another electronic device, as may be the case when a user upgrades from one electronic device to another, the device information can be written to the second device at optional step 804. Either step 803 or step 804 can be performed, in one embodiment, while the respective electronic device is stored in packaging.

Figure 9:
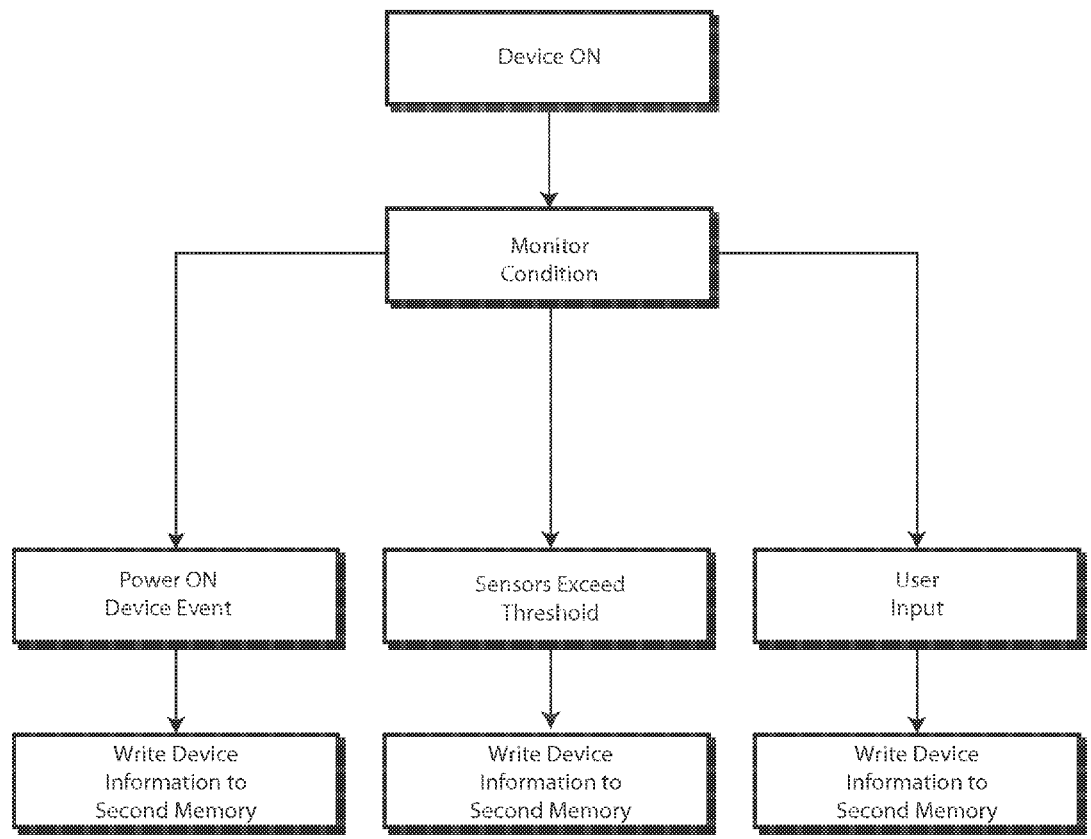
FIG. 9 illustrates another method for an electronic device configured in accordance with one or more embodiments of the invention.

Turning now to FIG. 9, illustrated therein is another method of making device information, which can include or comprise device configuration data, available from an electronic device when the electronic device is OFF. As shown in FIG. 9, the device is initially powered ON at step 901. The control circuit then monitors the conditions of the device at step 902. When a device event occurs, the control circuit can write information corresponding to the device event to the second memory, which is readable when the electronic device is OFF, at step 903. Similarly, when a device sensor exceeds a threshold, the control circuit can write information corresponding to the device event to the second memory at step 904. Additionally, if a user desires for some form of device information to be written to the second memory, they can apply user input at step 905. Accordingly, the control circuit can write information corresponding to the device event to the second memory, which is readable when the electronic device is OFF, at step 906.

While some embodiments of the invention have been described above with reference to FIGS. 1-9, FIGS. 10-15 provide some use cases to illustrate one embodiment of the invention in operation. Beginning with FIG. 10, a user 1000 is purchasing an electronic device 100 at a point of sale terminal 1001. The sales clerk 1002 is able to prepare the electronic device 100 for personalization upon powering ON while the electronic device 100 is still in the packaging 1003. Specifically, the sales clerk 1002 is able to deliver device personalization data to a memory 118 of an RFID tag 113 while the electronic device 100 is powered OFF and disposed within the packaging 1003 by using a RFID communication device 114. The RFID communication device 114 delivers the device configuration data to the memory 118 with RFID signals 117. Upon powering the electronic device ON, the electronic device can be configured as previously described.

Figure 10:
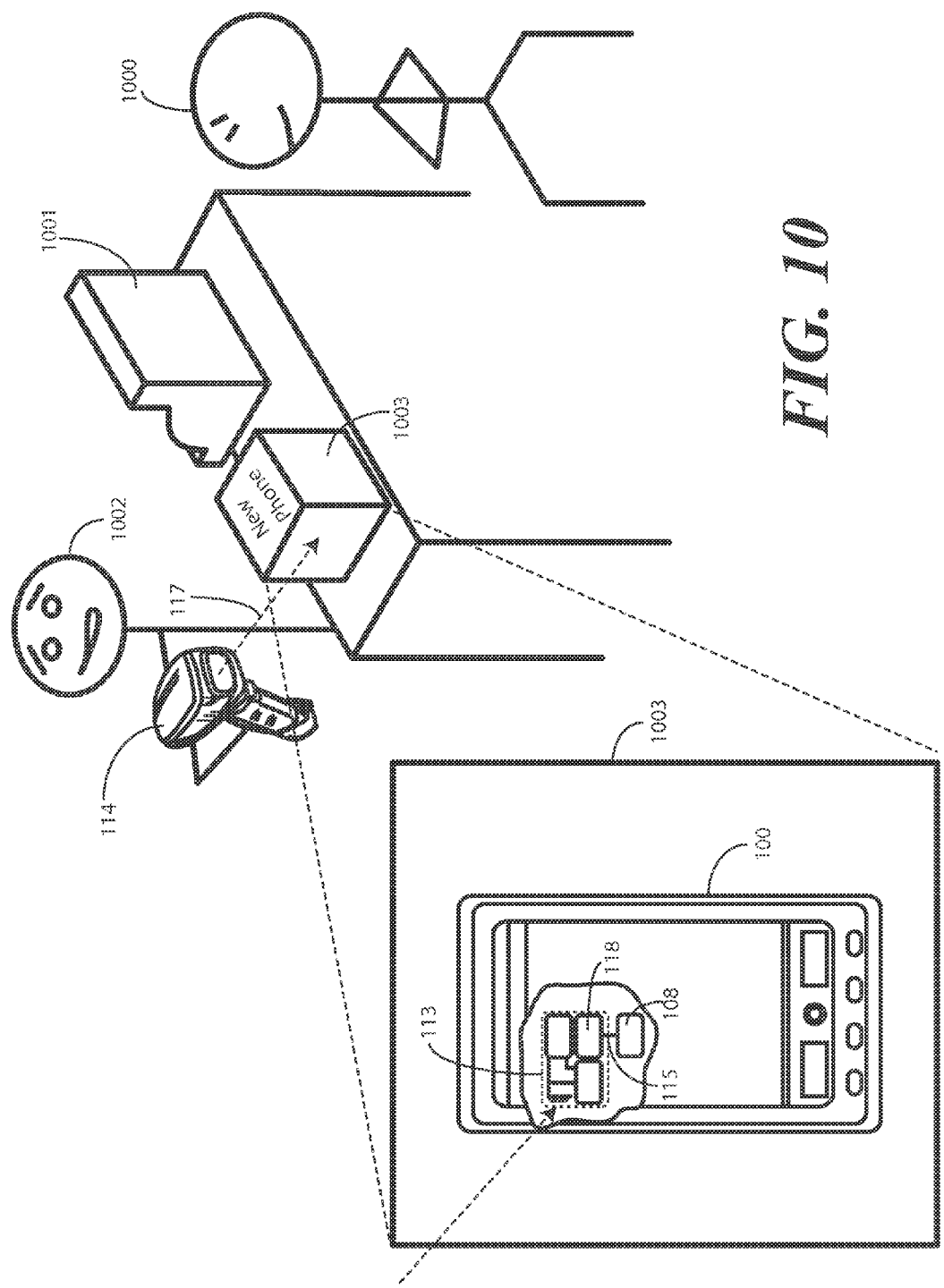
FIG. 10 illustrates another explanatory use case for one embodiment of an electronic device, and corresponding system, configured in accordance with one or more embodiments of the invention.

As shown in FIG. 10, the RFID communication device 114 can deliver personalization information, such as the user's name, wallpaper, ringtone, widgets, home screen layout, Wi-Fi SSIDs and passwords, email login credentials, personal greeting card, and so forth, to the embedded RFID tag 113 while the electronic device 100 is powered OFF. Upon powering up the electronic device 100 for the first time, the control circuit 108 can read out the stored personalization information via the communication bus 115, which in one embodiment is an I.sup.2.C interface, and correspondingly configure the electronic device 100 according to the retrieved personalization information.

Thus, with the embodiment of FIG. 10, a device manufacturer can deliver a magical, "right out-of-the-box" experience by personalizing the configuration of the electronic device 100 before the electronic device 100 is ever powered ON or taken out of the packaging 1003. The user 1000 may specify their interface language, country, preferred defaults, accounts, set of pre-installed applications, custom avatars, and so forth, either via online portal or right at the point of sale terminal 1001. The sales clerk 1002 may then use an RFID communication device 114 to pass these configuration bit(s) to the electronic device 100 while within its packaging 1003. When the user 1000 unboxes the electronic device 100 for the first time, the boot sequence reads the RFID bits locally and automatically configures the electronic device 100 in accordance therewith. The localization can be personalized, the home screen can be pre-configured, and the user's accounts may only await a password. This solution also means that a retailer can stock a single inventory and perform market-specific customizations "on the fly." The customization is secured out of the store by the block optional permalock feature of the RFID tag 113, which implements memory segment access control.

Turning now to FIG. 11, again the user 1000 is purchasing an electronic device at a point of sale terminal 1001. However, this time, the user 1000 has brought an old electronic device 1010 to the point of sale terminal 1001. The sales clerk 1002 is once again able to prepare the new electronic device for personalization upon powering ON while the electronic device is still in the packaging 1003. Specifically, the sales clerk 1002 first reads device personalization information form the old electronic device 1010 using the RFID communication device 114. Once this is completed, the sales clerk 1002 is able to deliver device personalization data to a memory 118 of an RFID tag 113 while the electronic device 100 is powered OFF and disposed within the packaging 1003 by using a RFID communication device 114. The RFID communication device 114 delivers the device configuration data to the memory 118 with RFID signals 117. Upon powering the electronic device ON, the electronic device can be configured as previously described.

If the sales clerk 1002 is unable to retrieve the device configuration information from the old electronic device 1010 using the RFID communication device 114, as would be the case with if the old electronic device 1010 were a prior art device, the sales clerk 1002 can still perform the configuration operation. In one embodiment, a software application running on the old electronic device 1010 allows the user 1000 to select what existing personalization features that they want to keep on the new electronic device. The application then sends the selected personalization data to an external RFID writer for configuring the new electronic device.

Figure 12:
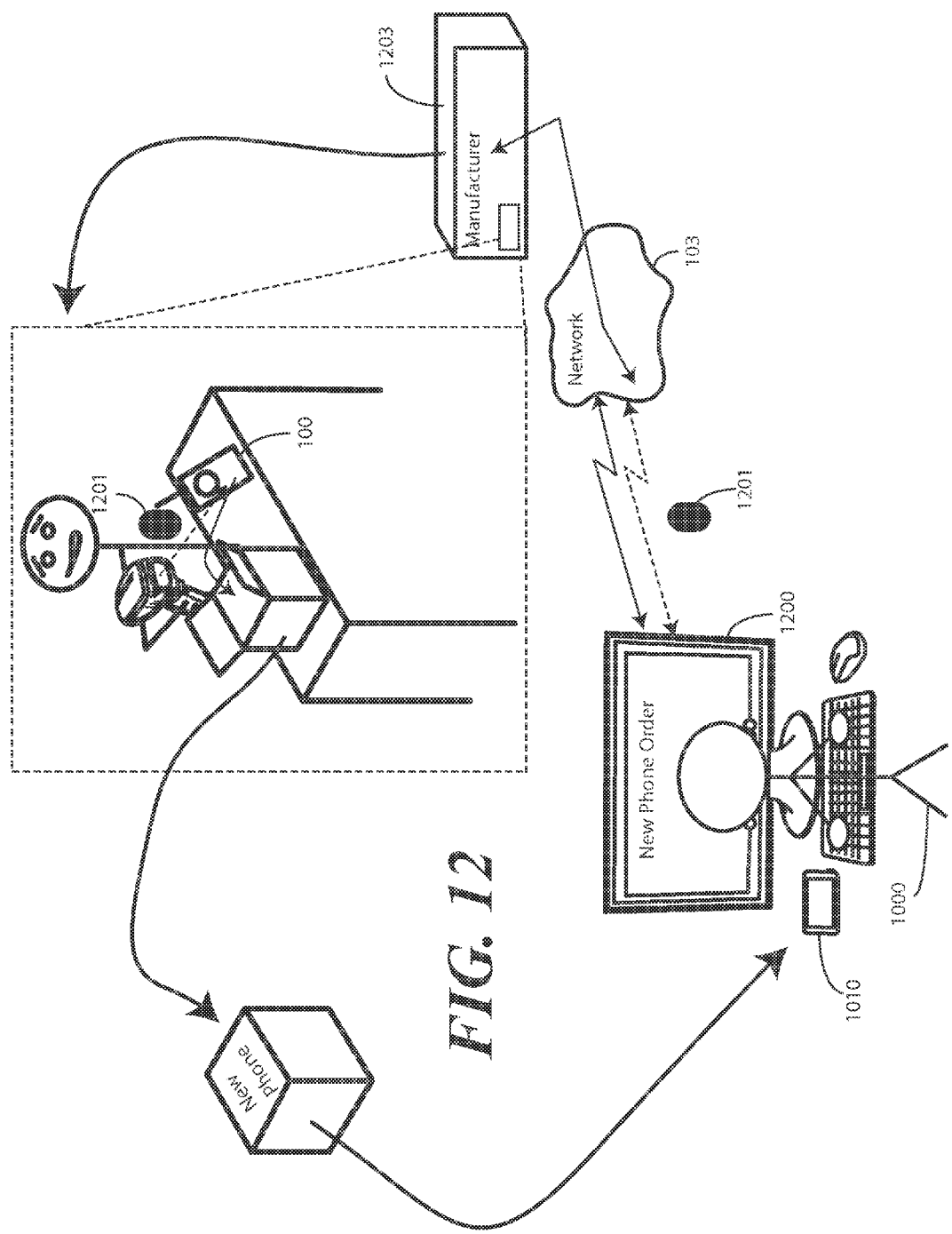
FIG. 12 illustrates another explanatory use case for one embodiment of an electronic device, and corresponding system, configured in accordance with one or more embodiments of the invention.

Turning now to FIG. 12, the user 1000 is ordering an electronic device 100 via a web portal 1200 configured as an on-line store. The user 1000 orders the electronic device 100 and enters or uploads (from an old electronic device 1010) the device configuration information 1201 into the web portal 1200. This device configuration information 1201 is then transmitted across a network 103 to the manufacturer 1203. The manufacturer 1203 then writes the device configuration information 1201 to the electronic device 100, which is then shipped to the user 1000. In one embodiment, the manufacturer 1203 writes the device configuration information 1201 to the electronic device 100 while the electronic device 100 is powered OFF and is disposed in an unopened box.

Figure 13:
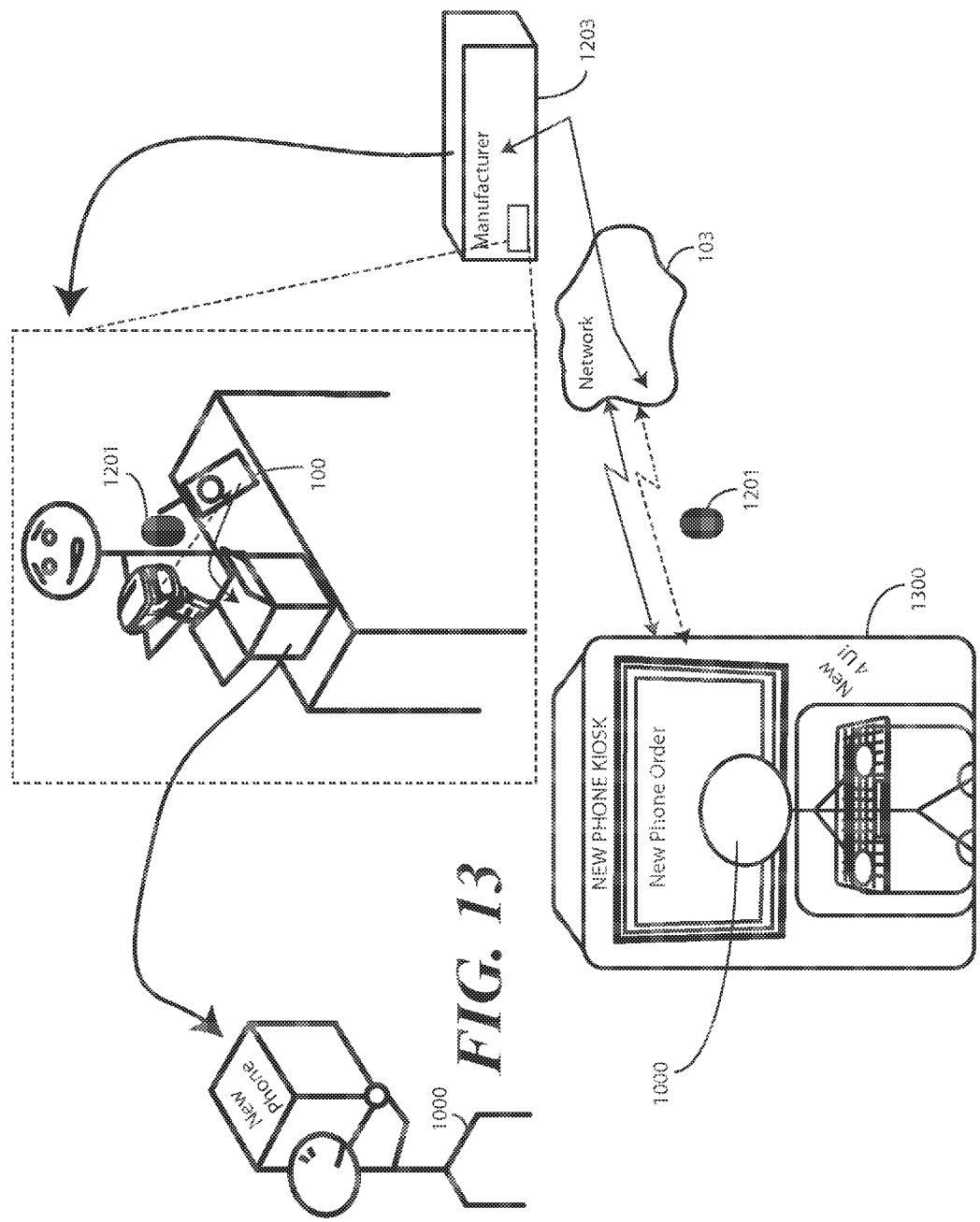
FIG. 13 illustrates another explanatory use case for one embodiment of an electronic device, and corresponding system, configured in accordance with one or more embodiments of the invention.

Turning now to FIG. 13, the user 1000 is ordering an electronic device 100 via a kiosk 1300 configured for retail sales. The user 1000 orders the electronic device 100 and enters or uploads the device configuration information 1201 into the kiosk 1300. This device configuration information 1201 is then transmitted across a network 103 to the manufacturer 1203. The manufacturer 1203 then writes the device configuration information 1201 to the electronic device 100, which is then shipped to the user 1000. In one embodiment, the manufacturer 1203 writes the device configuration information 1201 to the electronic device 100 while the electronic device 100 is powered OFF and is disposed in an unopened box. In one embodiment, the kiosk 1300 has an option to allow the user 1000 to record a audio file as ringtone, capture an image as wallpaper using a webcam, capture a video clip using the webcam as a greeting video, or upload audio files, upload image files, upload video files from an external source, store those files on a remote server, and/or save uniform resource locators as part of the device configuration data.

Figure 14:
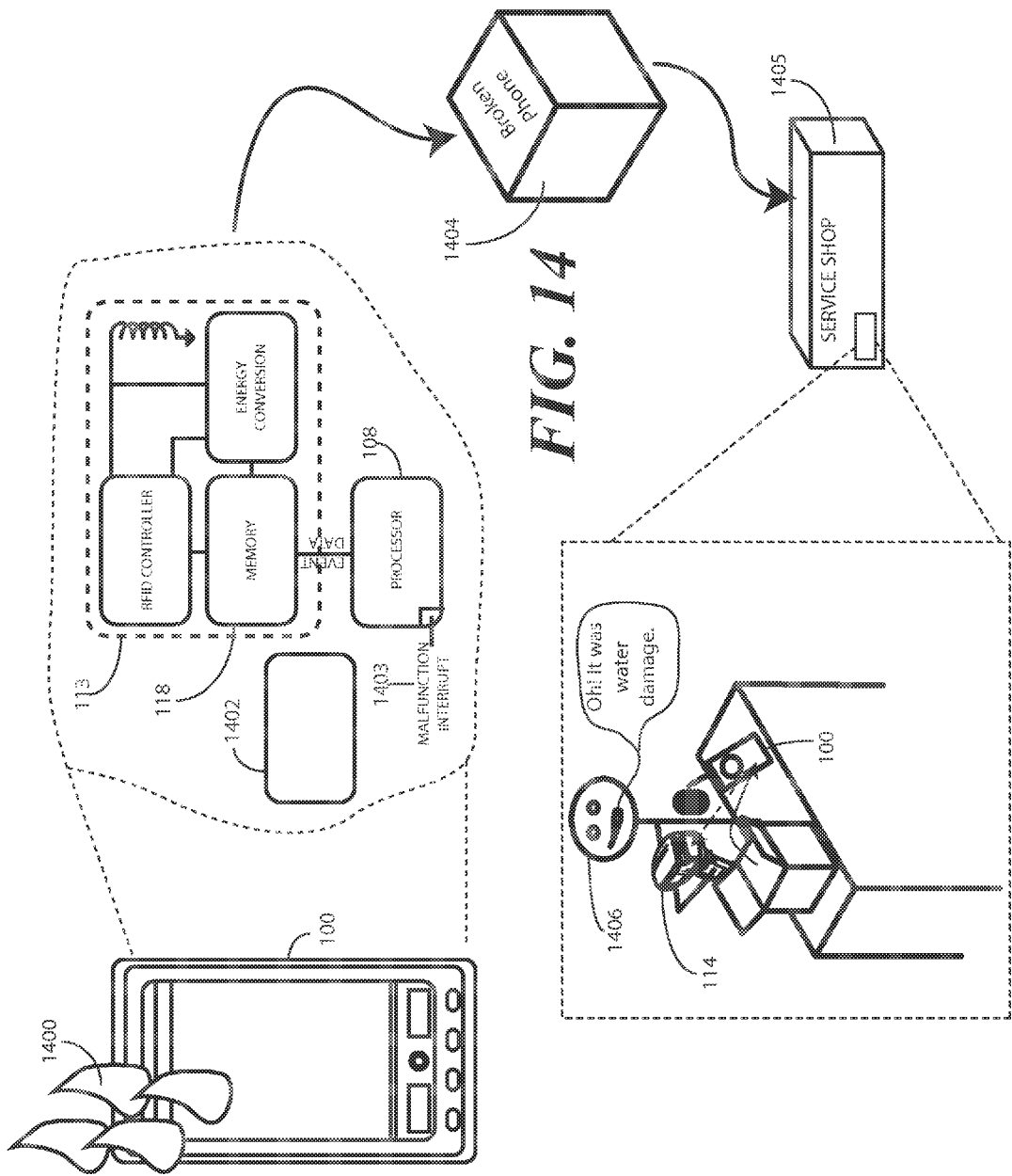
FIG. 14 illustrates another explanatory use case for one embodiment of an electronic device, and corresponding system, configured in accordance with one or more embodiments of the invention.

Turning now to FIG. 14, illustrated therein is a use case for servicing or repairing an electronic device 100 configured in accordance with one or more embodiments of the invention. As shown in FIG. 14, the electronic device 100 has been exposed to water 1400. When this occurs, a moisture sensor 1402 detects the water 1400 and generates a malfunction interrupt 1403 for the control circuit 108. The control circuit 108, upon receiving the malfunction interrupt 1403, writes a message from the moisture sensor 1402 to the memory 118 of the RFID tag 113. The message might say, "This device got wet!"

When the user ships the now damaged device 1404 to the service shop 1405, a service technician 1406 is able to quickly and easily diagnose the problem by reading the RFID tag 113 with an RFID communication device 114. The service technician 1406 can do this even though the control circuit 108 is no longer operational as a result of the exposure to water 1400 because the RFID tag 113 operates independently and can be read when the electronic device 100 is OFF.

Figure 15:
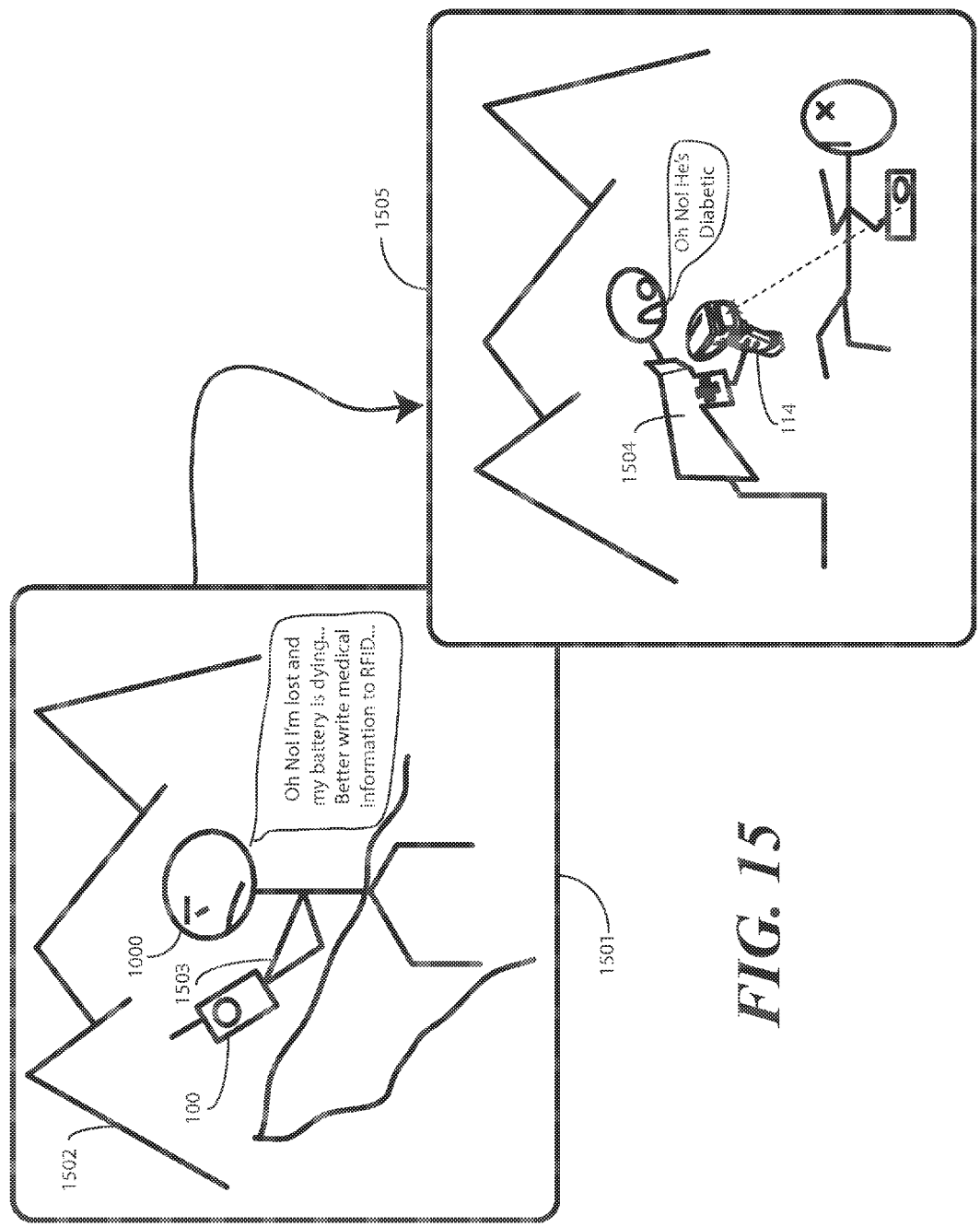
FIG. 15 illustrates another explanatory use case for one embodiment of an electronic device, and corresponding system, configured in accordance with one or more embodiments of the invention.

Turning now to FIG. 15, illustrated therein is a use case when the user 1000 intentionally causes information to be written to the RFID tag of the electronic device 100. As shown at step 1501, the user 1000 is hiking in the mountains 1502. The user 1000 notices that the battery of the electronic device 100 will soon be depleted. Fearing he will become lost in the mountains 1502, the user 1000 provides an input 1503 to the electronic device 100, which causes an interrupt to be delivered to the control circuit. The user 1000 then selects "medical information" to be written to the RFID tag. This pushes the user's medical information to the memory of the RFID tag.

As shown at step 1505, the user 1000 has collapsed from exhaustion. Further, the battery in the electronic device 100 is dead. Nonetheless, medical personnel 1504 is able to determine that the user 1000 is diabetic by reading the RFID tag with an RFID communication device 114. Accordingly, even though the user 1000 cannot speak and his electronic device 100 is inoperable, the medical personnel 1504 is able to rush the user 1000 to safety and provide the user 1000 with his life-saving insulin.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first memory;
   a control circuit to execute operating instructions for the electronic device retrieved from the first memory;
   an RFID tag embedded in the electronic device and comprising a second memory to store data readable from an RFID communication interface when the electronic device is OFF; and
   a communication bus coupling the control circuit and the second memory, the control circuit to write device information to the second memory in response to a trigger.

2. The electronic device of claim 1, the trigger comprising a detected operating malfunction.

3. The electronic device of claim 1, further comprising one or more device sensors operable with the control circuit, the trigger comprising the one or more device sensors detecting a condition exceeding a predefined device sensor threshold.

4. The electronic device of claim 3, wherein the one or more device sensors comprise a temperature sensor, a moisture sensor, an accelerometer, a gyroscope, a pressure sensor, or combinations thereof.

5. The electronic device of claim 1, the operating instructions to cause the control circuit to write the device information to the second memory in response to an interrupt.

6. The electronic device of claim 5, wherein the interrupt comprises a device sensor output responsive to a device condition.

7. The electronic device of claim 5, wherein the interrupt comprises user input.

8. The electronic device of claim 5, wherein the interrupt comprises an interrupt signal received from the communication bus in response to a query received from the RFID communication interface.

9. The electronic device of claim 1, wherein the device information comprises one or more of a user name, a user wallpaper preference, a user ringtone preference, a user home screen arrangement preference, a device name, a device model number, a device manufacturing date, a software version number, a hardware version number, a device serial number, a device purchase date, a device purchase place, a warranty expiration date, a hardware failure code, a hardware time of failure, a software crash code, or combinations thereof.

10. The electronic device of claim 1, the control circuit to assign an access the device information prior to writing the device information to the second memory.

11. The electronic device of claim 1, the second memory being partitioned into sections requiring different credentials for access thereto, the control circuit to select one of the sections prior to writing the device information to the second memory.

12. The electronic device of claim 1, wherein the device information comprises emergency information associated with a device user.

13. The electronic device of claim 1, wherein the device information comprises barcode information.

14. The electronic device of claim 1, wherein the device information comprises service information.

15. A method of making device information available from an electronic device when the electronic device is OFF, comprising:
   detecting the device information with a control circuit operable with a first memory; and
   writing the device information to a second memory of an RFID tag embedded within the electronic device and operable with an RFID communication interface, the second memory readable through the RFID communication interface when the electronic device is OFF.

16. The method of claim 15, the detecting comprising detecting an occurrence of a predefined operating condition.

17. The method of claim 15, the device information being detected from user input.

18. The method of claim 15, further comprising reading the device information with an RFID communication device.

19. The method of claim 18, the reading occurring while the electronic device is disposed within packaging.

20. The method of claim 18, further comprising writing the device information to a second electronic device with the RFID communication device.

* * * * *